United States Patent
Carter

(10) Patent No.: US 6,275,819 B1
(45) Date of Patent: Aug. 14, 2001

(54) METHOD AND APPARATUS FOR CHARACTERIZING AND RETRIEVING QUERY RESULTS

(75) Inventor: Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/270,382

(22) Filed: Mar. 16, 1999

(51) Int. Cl.[7] .................................................... G06F 17/00
(52) U.S. Cl. ................................... 707/2; 702/101; 717/1
(58) Field of Search ........................ 707/1–10, 100–104, 707/200–206; 717/1, 5, 7, 8; 705/1

(56) References Cited

U.S. PATENT DOCUMENTS

| | | | | |
|---|---|---|---|---|
| 6,026,391 | * | 2/2000 | Osborn et al. | 707/2 |
| 6,026,397 | * | 8/2000 | Sheppard | 707/2 |
| 6,028,999 | * | 2/2000 | Pazel | 717/1 |
| 6,112,209 | * | 8/2000 | Gusack | 707/101 |

OTHER PUBLICATIONS

Kitsuregawa et al., "Web mining and its SQL based parallel execution", Information Technology for Virtual Enterprises, 2001, ITVE 2001, Proceedings, Workshop on, pp. 128–134, Jan. 2001.*

Menasce et al., "A method for design and performance modeling of client/server systems", Software Engineering, IEEE Transactions on, vol. 26 Issue 11, pp. 1066–1085, Nov. 2000.*

Dyreson et al., "Efficiently supporting temporal granularities", Knowledge and Data Engineering, IEEE Transactions on, vol. 12, Issue 4, pp. 568–587, Jul. 2000.*

* cited by examiner

Primary Examiner—Thomas Black
Assistant Examiner—David Jung
(74) Attorney, Agent, or Firm—Dinsmore & Shohl LL

(57) ABSTRACT

A system and method used to characterize query results and retrieve the query results based on the characterization. An informational resource is queried and query results are received. The filter arguments, filter values, data set names and data item labels of the query are determined. The query results are stored locally, such as in cache, and registered based on the determined filter arguments, filter values, data set names and data item labels. Using the registration, all or a portion of the stored query results can be retrieved.

22 Claims, 4 Drawing Sheets

METHOD AND APPARATUS FOR CHARACTERIZING AND RETRIEVING QUERY RESULTS

TECHNICAL FIELD

The present invention relates generally to computer systems and methods, and will be specifically disclosed as a method and apparatus for characterizing and retrieving query results.

BACKGROUND OF THE INVENTION

The virtual explosion of technical advances in microelectronics, digital computers and software have changed the face of modern society. In fact, these technological advances have become so important and pervasive that this explosion is sometimes referred to as "the information revolution." Through telephone lines, cables, satellite communications and the like, information and resources are ever increasingly being accessed and shared.

A request for information is called a query. Very often, particularly with remotely networked computers (such as the Internet), the retrieval of information or data responsive to a query is slow or otherwise expensive to retrieve. For instance, the retrieval of information from a remote location is limited by the speed of the connection, which is sometimes referred to as bandwidth. In the case of the Internet, the bandwidth is typically limited by the throughput capability of a modem or the remote computer from which information is being retrieved.

Once information is retrieved, it is often desirable to store the information locally, where it can be quickly and easily accessed. One such example of local storage is volatile or nonvolatile cache memory. Local storage is a relative term depending upon the source of the information and can include many variations. For instance, information retrieved over the Internet from a distant server could be storage locally in a server within a local network. As a further example, information retrieved for a server on a local network could be stored locally on a workstation. While local storage of information has an advantage of quick and inexpensive retrieval, it is desirable for such information to be organized for subsequent retrieval. In part, the present invention provides a method and means for characterizing query results for subsequent retrieval.

SUMMARY OF THE INVENTION

Accordingly, an object of the invention is to provide a method and system for characterizing and retrieving data. Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

In one aspect of the invention, a method is used to characterize query results. One or more informational resources are queried and the query results are received. The filter arguments, filter values, data set names, and data item labels corresponding to the query results are determined. The query results are registered in cache based on the filter arguments, filter values, data set names, and data item labels. Using the registration, the query results from the cache are retrieved.

Another aspect of the invention is a reference to data values stored on a computer readable medium. The data values are responsive of a query to a data set on an informational resource, the data set having a data set name. The query has one or more filter arguments, one or more filter values and one or more data items labels. The reference includes a first identifier corresponding to the data set name of data set on the informational resource. A second identifier corresponds to the filter arguments of the query. A third identifier corresponds to the filter values of the query. A fourth identifier corresponds to the data item labels of the query.

Yet another aspect of the present invention is a method for retrieving data values using a reference. The reference corresponds to data values stored on the computer readable medium. A query is received which includes one or more data set names, one or more filter arguments, one or more filter values, and one or more data item labels. It is determined whether the data set names in the query correspond to a first identifier in the reference, whether the filter arguments in the query correspond to a second identifier in the reference, whether the filter values of the query correspond to a third identifier in the reference, and whether the data item labels of the query correspond to a fourth identifier in the reference. If all of the determinations are affirmative, then at least a portion of the data values are retrieved from the computer readable medium.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Figure 1:
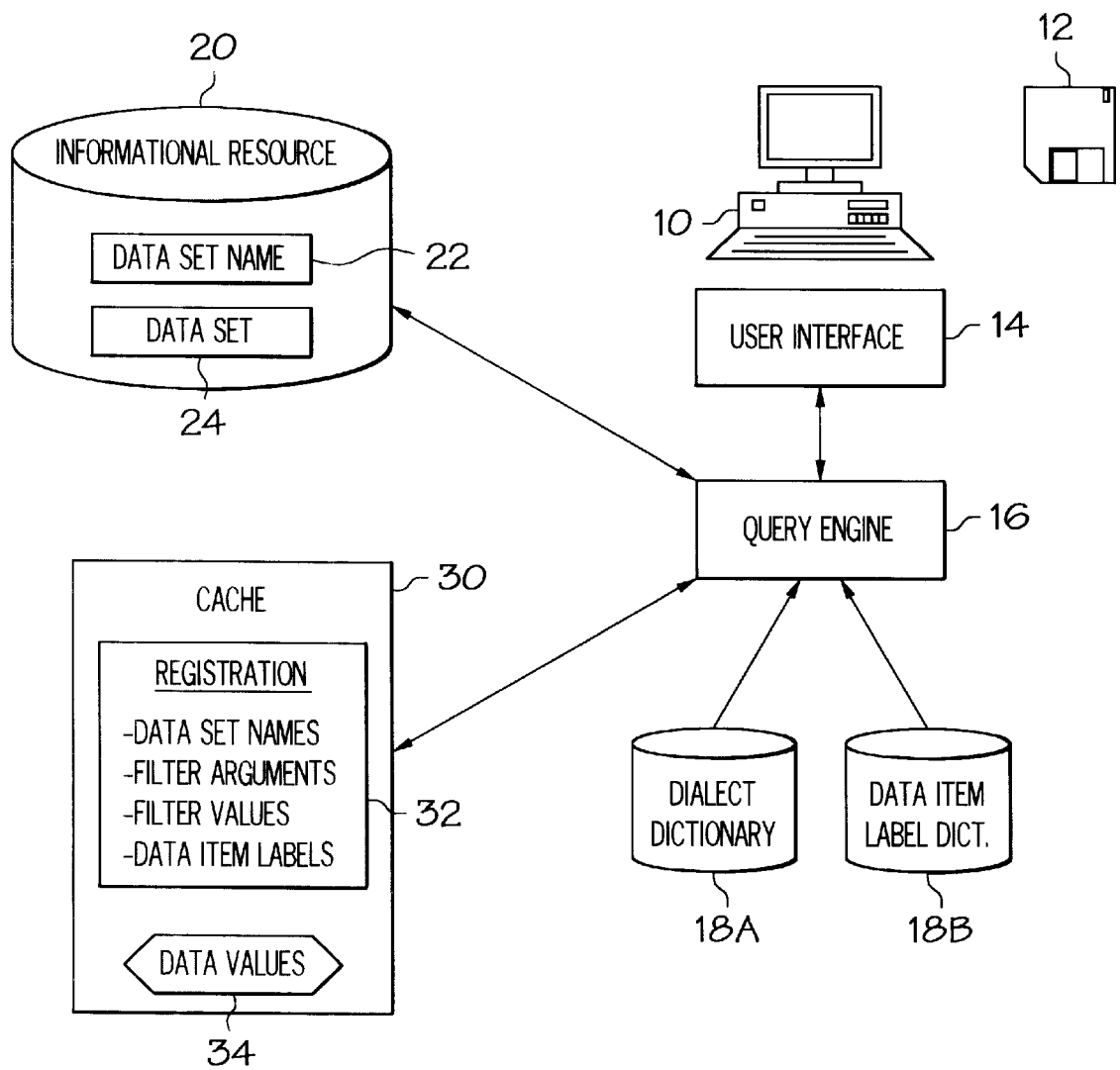
FIG. 1 illustrates a computer system.

FIG. 1 illustrates a computer system. The system includes a computer 10, such as a personal computer, a server, or any other appropriate device capable of being programmed. Programs and data for the computer 10 are generally stored on a computer readable medium 12. The computer readable medium 12, shown here as a floppy diskette, holds information readable by a computer, such as programs, data, files, etc. As one with ordinary skill in the art will readily appreciate, computer readable media can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Certain types of computer readable media, which are sometimes described as being nonvolatile, can retain data in the absence of power so that the information is available when power is restored.

An optional user interface 14 comprises a series of instructions for the computer 10. The user interface 14 acts an intermediary or interface between a human user of the computer 10 and other programs. As shown in this example, the user interface 14 is designed to interface with the query engine 16. The query engine 16 is a program comprising a series of instructions, preferably stored on a computer readable medium. The query engine 16 can comprise a one or more program modules, files or libraries, any one of which can be located locally on the computer 10 and/or remotely on other computers (such as on a local area network "LAN", on a wide area network "WAN", on the Internet, or any other remote communications system). For the purposes of illustration, the various program modules, files or libraries of the query engine 16 are shown as a single functional program block.

The query engine 16 is operative to receive and process a variety of different types of queries or other requests for information. In one preferred embodiment, the query engine processes a set query language "SQL", however, the present invention lends itself to any other query formats. SQL provides a format or set of rules through which information in databases can be requested. The user interface 14 is operative for preparing, formatting and editing SQL queries, as well as viewing, manipulating and using query results. One with ordinary skill in the art will recognize that SQL and databases are merely a preferred embodiment, and that other forms of queries and informational resources are also applicable to the present invention.

The query engine 16 is also operative for accessing and receiving data from a variety of sources. As shown in this example, the query engine 16 is capable of receiving data from an optional dialect dictionary 18A and an optional data item label dictionary 18B. Preferably, both dictionaries 18A, 18B are relational databases stored on one or more nonvolatile computer readable media. The dialect dictionary 18A includes information for normalizing queries. For instance, various versions of SQL may have different SQL dialects. An ORACLE SQL may have one dialect of SQL which uses a different syntax than a MICROSOFT SQL. In one embodiment, the dialect dictionary 18A contains information to normalize the various SQL dialects into a base dialect which the query engine 16 can understand and process.

The data item label dictionary 18B contains information for normalizing data item labels from a variety of different informational resources into a common schema. In the case of informational resources having relational database, the data item label dictionary 18B contains information to translate a variety of different fields that refer to the same information into a common field name. For instance, a variety of different database resources may label the field for social security number as SSN, S/N, Social, or the like. The data item label dictionary 18B provides information to translate these various fields to determine that they all refer to social security number, and map those fields to a common field or label (e.g. SSN) that the query engine 16 would use.

Preferably, both the dialect dictionary 18A and the data item label dictionary 18B are dynamic and can be modified. The query engine 16 can be programed to automatically update the dictionaries 18A, B, such as if new information resources are encountered or if the base dialect or schema are modified. Further, the user interface 14 can be programmed to allow a user to manually manipulate the dictionaries 18A, B.

The query engine 16 is additionally operative to communicate with one or more informational resources. As discussed above, an informational resource can take a variety of forms, including relational databases, hierarchal databases, directories, hypertext markup language "HTML" documents, web pages, files, textual documents, blobs, sets of formatted transactions, and the like. For the purposes of illustration, assume that the informational resource 20 is a relational database stored in a distant location, such as on the Internet. The informational resource 20 includes one or more data sets 24, each of which typically includes some kind of data set name 22. The data set name 22 can be textual, numeric, an address or pointer, or any other appropriate means for identifying the corresponding data set 24. If the data set name 22 for a given data set 24 cannot be determined from the informational resource 20, the query engine 16 assigns an appropriate data set name 22.

The query engine 16 is also operative to send one or more queries to the informational resource 20. Appropriate type of query will depend upon the type of informational resource 20 being queried. Generally, the query identifies the data set name 22 and preferably includes one or more filter arguments, one or more filter values, and one or more data items. The filter arguments, filter values, and data items are used to narrow the data set 24 to a portion of information that is desired, however, the entire data set could also be responsive to a query. In the case of an SQL query to a relational database, a filter argument identifies a field that is being restricted, and the corresponding filter value is the value that the field is being restricted against. The data item labels refer to the fields of data which are being extracted or returned from the relational database. By way of illustration, consider the following example of a SQL query: Select Customer Master with Last Name="Carter" SSN, Last Name, First Name. "Customer Master" is the data set name 22, "Last Name" is the filter argument, "Carter" is the filter value, and "SSN, Last Name, First Name" are the data item labels.

The query engine is further operative to receive data values 34 responsive to the queries from the data set 24. The query engine 16 stores the responsive data values 34 locally, such as in cache 30. The query engine also creates a registration 32 in cache which corresponds to the data values 34. The registration 32 provides a reference so that the data values 34, or a portion thereof, may subsequently be retrieved from cache 30. Preferably, the registration 32 comprises a series of identifiers. As shown in this example, the registration 32 includes a first identifier corresponding to the data set name 22, a second identifier corresponding to the filter arguments of the query, a third identifier corresponding to the filter values of the query, and a fourth identifier corresponding to any data item labels of the query. The identifiers are preferably determined from the query, however, the query engine 16 can also determine the appropriate identifiers from the content of the data values 34, such as through linguistic morphology or other content interpreting means. By referencing the registration 32, the query engine 16 can locally retrieve all or a portion of the data values 34 from the cache 30.

Occasionally, the data values 34 may become stale or otherwise inaccurately reflect the information in the data set 24, at which point the data values 34 and registration 32 could be purged. Alternatively, an updating query could be generated based on the registration 32, the updating query submitted to the informational resource 20, and the query results substituted for the data values 34. Preferably, an updating query would be submitted during a period of low usage so as not to unduly tax the bandwidth between the query engine 16 and the informational resource 20.

Figure 2:
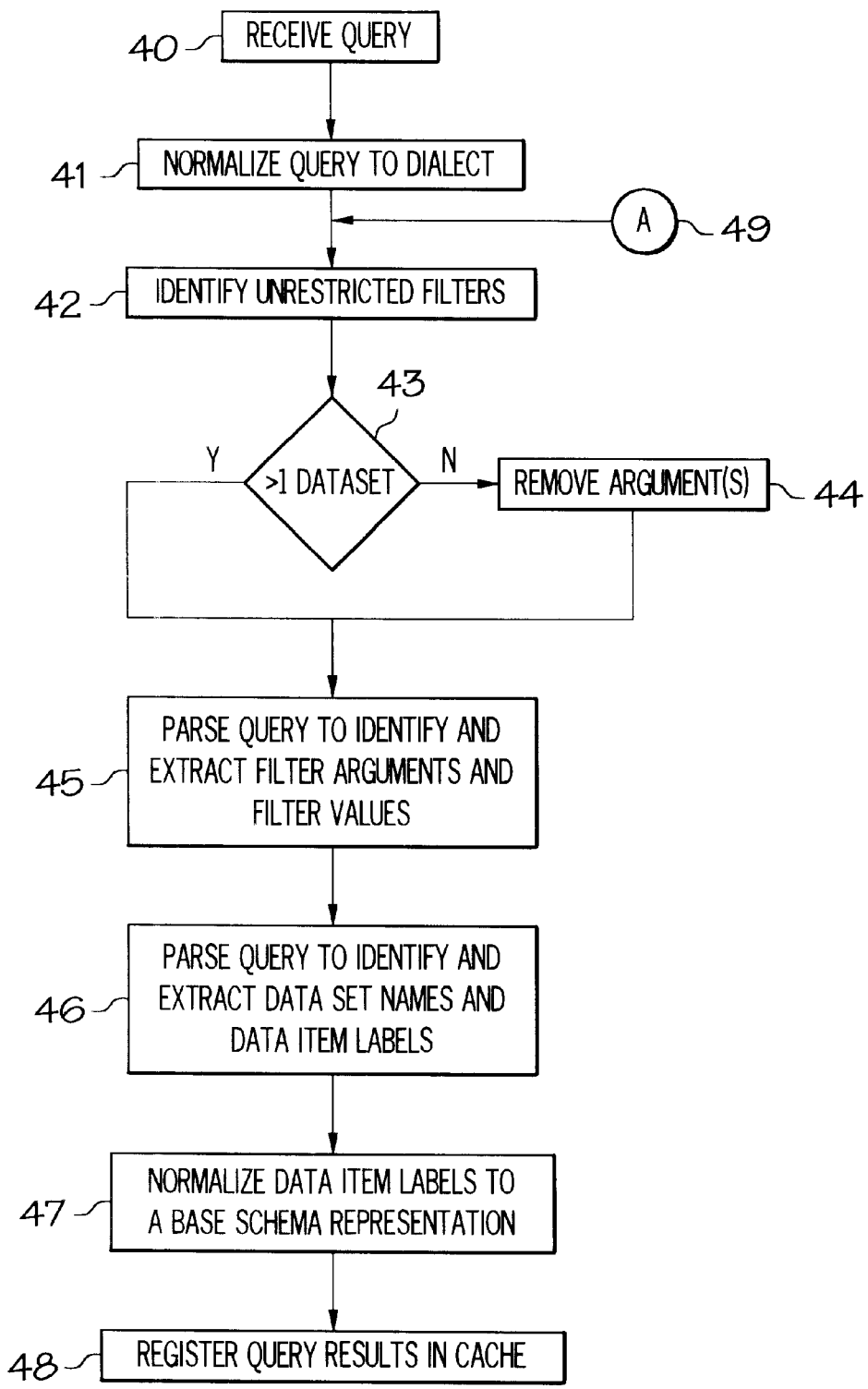
FIG. 2 illustrates a flowchart of a method for characterizing a query result.

FIG. 2 depicts an embodiment of a method for characterizing a query result. Preferably, the method is embodied as a series of instructions stored on a computer readable medium. In step 40, a query is received. Optionally, the query is normalized to a base dialect in step 41, preferably using a dictionary such as the dialect dictionary 18A. One with ordinary skill in the art will readily recognize that the query normalization step can be achieved with any one of a variety of techniques currently being practiced in the art. At step 42, any unrestricted filters in the query are identified. An example of an unrestricted filter is a wild card entered as a filter value (e.g. Last Name=*). At step 43, if only one data set is identified in the query, then the method proceeds to step 44 where any unrestricted filters are removed. The entire argument is removed because it is not helpful in characterizing the returned data values, since for example, the returned data values will include everything that has a Last Name.

Continuing to step 45, the query is parsed to identify and extract the filter arguments and filter values. If any filter argument or filter values were removed in step 44, then nothing will be extracted. At step 46, the query is parsed to identify and extract the data set names and data item labels. In step 47, the data item labels are then normalized to a base schema representation, preferably using a dictionary such as the data item label dictionary 18B. Using the extracted filter arguments, filter values, data set names and data item labels, at step 48 the returned data values 34 are cached and the registration 32 is entered accordingly.

Consider the following example for normalizing data items labels. Data item labels are known by different names as per the context of the user. Views are designed to communicate with the user in the context of use. Where one department may use "Last Name", another may use "Sur Name". Both usages are correct, however, to provide consistency the database administrator can design the base schema to have a single definition for "Last Name"/"Sur Name" and may perhaps name it LN48. Even this data name is in the context of the database administrator and may mean, for example, Last Name PIC 48X. The normalization of the "Last Name" and "Sur Name" would be performed by replacing both data item labels by the base schema label LN48. Also note that legacy databases may have other LN fields. The database in question may have been created from several, older still, legacy databases and one of the databases may have had a LN40 that can be accommodated.

Data item labels may also be calculated or constructed (e.g., virtual fields). In this case there is usually, but not always, a base schema data item label to map to, however, the data item label does not really exist. It may be the concatenation of several data item labels, the creation of a number by performing arithmetic on other data item labels, a lookup from another data set, etc. It is still advantageous to use the base schema data item label name to provide a ready mapping from different views.

Figure 3:
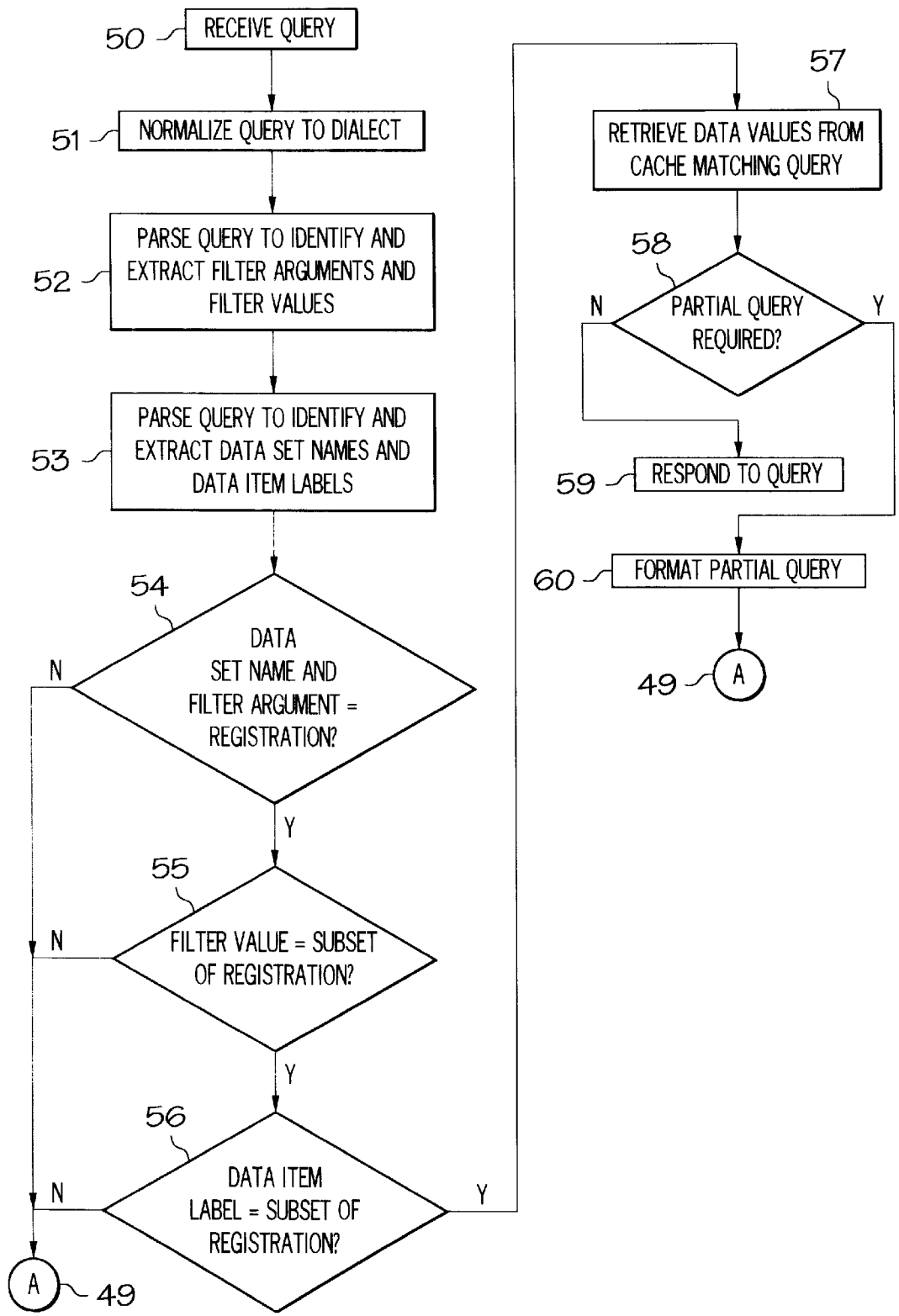
FIG. 3 illustrates a flowchart of a method for retrieving query results.

FIG. 3 illustrates an embodiment of a method for retrieving query results after they have been stored locally. At step 50, a new query is received, and at step 51 the query is normalized to a dialect. At step 52, the query is parsed to identify and extract the filter arguments and filter values. At step 53, the query is parsed to identify and extract the data set names and data item labels. Optionally, the data item labels can be normalized to a base schema representation.

The next three decision blocks are used to determine whether the previously cached data values 34 satisfy the new query, is whole or in part. At decision block 54, the data set name and filter arguments from the new query are compared to the registration 32 in cache 30 to determine if they match. If the data set name and filter arguments from the new query matches the first and second identifiers in the registration 32, respectively, then we know that the new query might be a satisfied at least in part by the data values 34 in cache 30. If decision block 54 is satisfied, then the method proceeds to step 55 where the extracted filter value from the new query in compared to the registration 32. If the extracted filter value is a subset of the third identifier, then we know that the new query might be a satisfied at least in part by the data values 34 in cache 30. For instance, if the second and third identifiers in the registration 32 correspond to Name= "Car*", and the new query filter argument was Name= "Carter", we know that the new query is a subset of the second and third identifiers. In the event that the filter value from which the registration was generated was an unrestricted filter, then decision block 55 should be satisfied.

If decision block 55 is satisfied, then the method proceeds to decision block 56, where the data item labels extracted from the new query are compared to the registration 32. If the extracted data item labels are a subset of the fourth identifier of the registration 32, then we know that the new query might be a satisfied at least in part by the data values 34 in cache 30. If decision block 56 is satisfied, then the method proceeds to step 57 where the portion (if not all) of the data values 34 satisfying the new query are extracted from cache 30. If any of decision blocks 54, 55, or 56 are not satisfied, then the method proceeds to step 49 where the informational resource 20 is queried, and the method continues into the method of FIG. 2.

At decision block 58, the method determines whether a partial query is required from the informational resource 20. For instance, if the cached data values 34 satisfy a portion of the new query, then a partial query is desirable since the cached data values 34 cannot provide all the requested information. If a partial query is not required, the method proceed to step 59, where the new query is responded to using the portion of data values 34 retrieved in step 57. For instance, the retrieved data values could be passed to the user interface 14 in an appropriate format.

Consider the following example. Assume that the cached data values 34 are responsive to the query Select PersonMaster with LastName="Car*" LastName FirstName BirthDate Gender Salary HireDate. The data values 34 would contain completely the response for a new query of Select PersonMaster with LastName="Car*" LastName FirstName BirthDate Gender. In this case the cached, existing sub-relation may be queried for the entire response to the query. The retrieved data would not include data values corresponding to the data item labels Salary and HireDate, since that information was not requested in the new query. The resulting sub-relation need not be registered or cached because the data is already available in the cache.

If, however, a partial query is desired, the method proceeds to step 60 where a partial query is formatted. Preferably, the partial query is formatted to ask only for data values not retrieved during step 57. Consider the following example of a new query: Select Customer Master with Last Name="Carter" SSN, Last Name, First Name, Telephone. If the retrieved data values in step 57 satisfied everything except the "Telephone" data item label (i.e. all the information for the new query was found in the data values 34, except for the "Telephone" data item label), then the partial query could be formatted as follows to retrieve only the missing information: Select Customer Master with Last Name="Carter" Telephone. At step 49, the informational resource 20 is queried using the formatted partial query, and the method continues into the method of FIG. 2.

Figure 4:
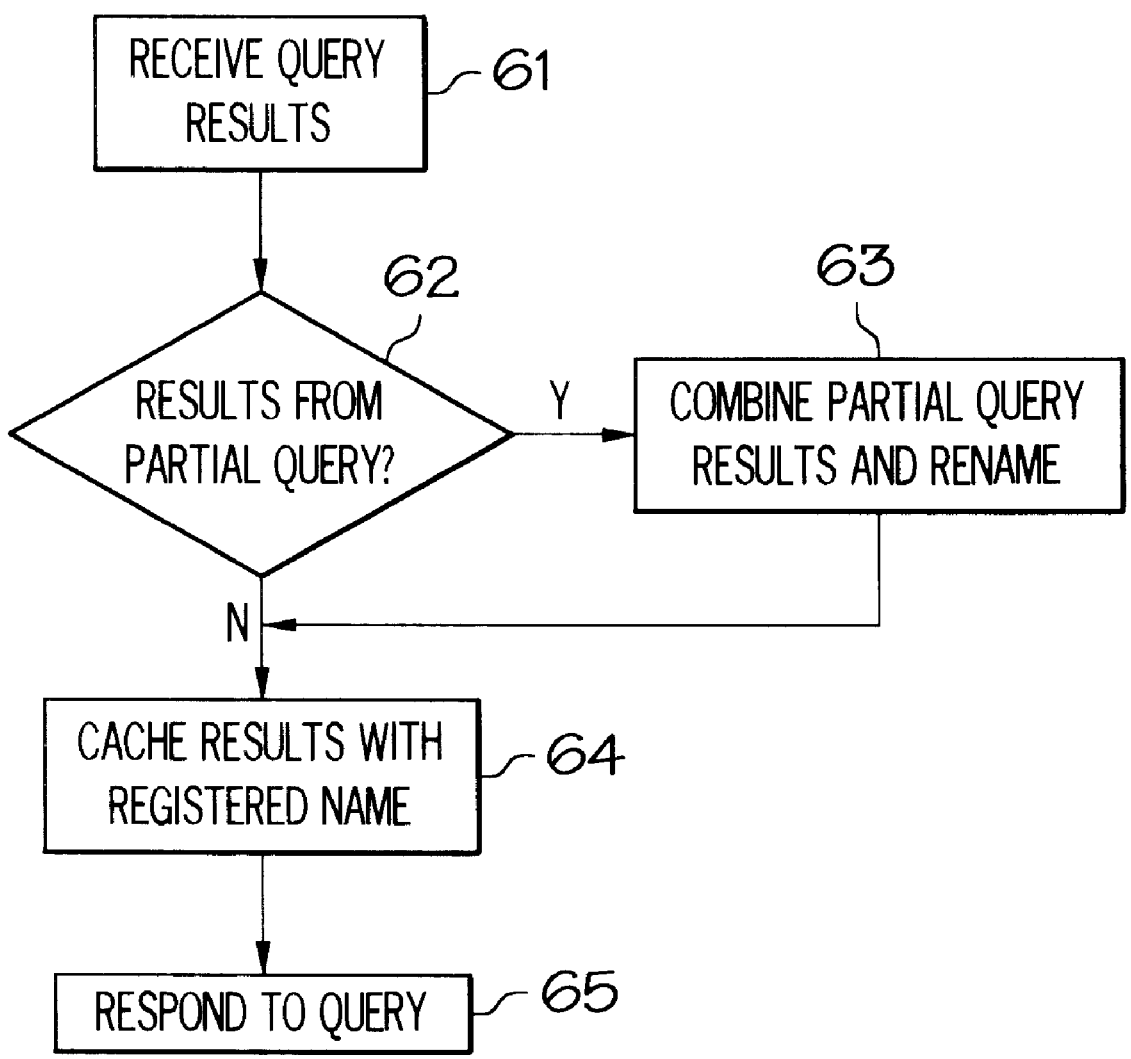
FIG. 4 illustrates a flowchart of a method for processing query results.

FIG. 4 depicts an embodiment of a method of how query results received from the informational resource 20 are processed. At step 61, query results are received. If decision block 62 determines that the results are from a partial query, the method proceeds to step 63. At step 63, the partial query results are combined with the retrieved data values 34 that satisfy the remainder of the query, and the combined query results are renamed. At step 64, the query results are cached with a registered name. At step 65 the query results are provided for use, such as through the user interface 14.

Consider the following example. Assume cached data values are responsive to the following query: Select PersonMaster with LastName="Car*" LastName FirstName BirthDate. A subsequent query may be a proper subset excepting some columns, such as: Select PersonMaster with LastName="Car*" LastName First Name BirthDate Gender. In this case we can send the partial query: Select PersonMaster with LastName="Car*" Gender. The results of the partial query can then be joined with the existing cached sub-relation with the new sub-relation and register the new sub-relation: Select PersonMaster with LastName="Car*" LastName FirstName BirthDate Gender. A different subsequent query may be a proper subset excepting some columns, such as: Select PersonMaster with LastName="Carter" LastName FirstName Birth Date Gender. In this case we can send the partial query: Select PersonMaster with LastName="Carter" Gender. Data values are extracted from cached matching: Select PersonMaster with LastName="Carter" LastName FirstName BirthDate. The two results are then combined to end up with: Select PersonMaster with LastName="Carter" LastName FirstName BirthDate Gender. This can then be cached and registered under its own name.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

What is claimed is:

1. A method for characterizing query results, the method comprising the steps of:
    a) querying one or more informational resources;
    b) receiving the results of the query;
    c) determining filter arguments corresponding to the query results;
    d) determining filter values corresponding to the query results;
    e) determining data set names corresponding to the query results;
    f) determining data item labels corresponding to the query results;
    g) registering the query results in cache based on the filter arguments, filter values, data set names, and data item labels; and
    h) retrieving the query results from the cache using the registration.

2. The method of claim 1, wherein at least one or more of the informational resources is a database.

3. The method of claim 1, further comprising the step of normalizing the data item labels to a base schema.

4. The method of claim 1, wherein the steps are performed sequentially as listed.

5. A computer readable medium comprising instructions capable of performing the method of claim 1.

6. The method of claim 1, wherein the step of registering comprises using the data set names as a first identifier.

7. The method of claim 6, wherein the step of registering comprises using the filter arguments as a second identifier.

8. The method of claim 7, wherein the step of registering comprises using the filter values as a third identifier.

9. The method of claim 8, wherein the step of registering comprises using the data item labels as a fourth identifier.

10. The method of claim 1, wherein the steps of determining comprises extracting information from the query.

11. The method of claim 10, wherein the step of extracting comprises parsing the query.

12. A reference to data values stored on a computer readable medium, the data values being responsive of a query to one or more data sets on one or more informational resources, the query having one or more filter arguments, one or more filter values and one or more data item labels, the data sets on the informational resources each having a data set name, the reference comprising:
    a) a first identifier corresponding to the data set name for the data set on the informational resource;
    b) a second identifier corresponding to the filter arguments of the query;
    c) a third identifier corresponding to the filter values of the query; and
    d) a fourth identifier corresponding to the data item labels of the query.

13. The reference of claim 12, wherein the computer readable medium is a cache.

14. A computer system comprising the cache and the reference of claim 13.

15. A method for retrieving at least a portion of the data values using the reference of claim 12, the method comprising the steps of:
    a) receiving a second query including one or more data set names, one or more filter arguments, one or more filter values, and one or more data item labels;
    b) determining whether the data set names in the second query correspond to the first identifier;
    c) determining whether the filter arguments in the second query correspond to the second identifier;
    d) determining whether the filter values of the second query correspond to the third identifier;
    e) determining whether the data item labels of the second query correspond to the fourth identifier; and
    f) if steps (b)–(e) are affirmative, then retrieving at least a portion of the data values from the computer readable medium.

16. The method of claim 15, further comprising the step of: if any of steps (b)–(e) are negative, then querying at least one of the informational resources using the second query.

17. The method of claim 15, further comprising the steps of:
    g) determining whether the data values are fully responsive to the second query; and
    h) if step (g) is negative, then preparing a third query and querying at least one of the informational resources using the third query.

18. The method of claim 15, further comprising the step of normalizing the second query to a dialect.

19. The method of claim 15, further comprising the steps of:
   g) determining whether a third partial query is required; and
   h) if step (g) is affirmative, then preparing a partial query and submitting the partial query to the information resources.

20. The method of claim 15, wherein the steps are performed sequentially as listed.

21. A computer readable medium comprising instructions capable of performing the method of claim 15.

22. A computer system for characterizing query results, the system comprising:
   a) means for querying one or more informational resources;
   b) means for receiving the results of the query;
   c) means for determining filter arguments corresponding to the query results;
   d) means for determining filter values corresponding to the query results;
   e) means for determining data set names corresponding to the query results;
   f) means for determining data item labels corresponding to the query results;
   g) means for registering the query results in cache based on the filter arguments, filter values, data set names, and data item labels; and
   h) means for retrieving the query results from the cache using the registration.

* * * * *